Figure 1:
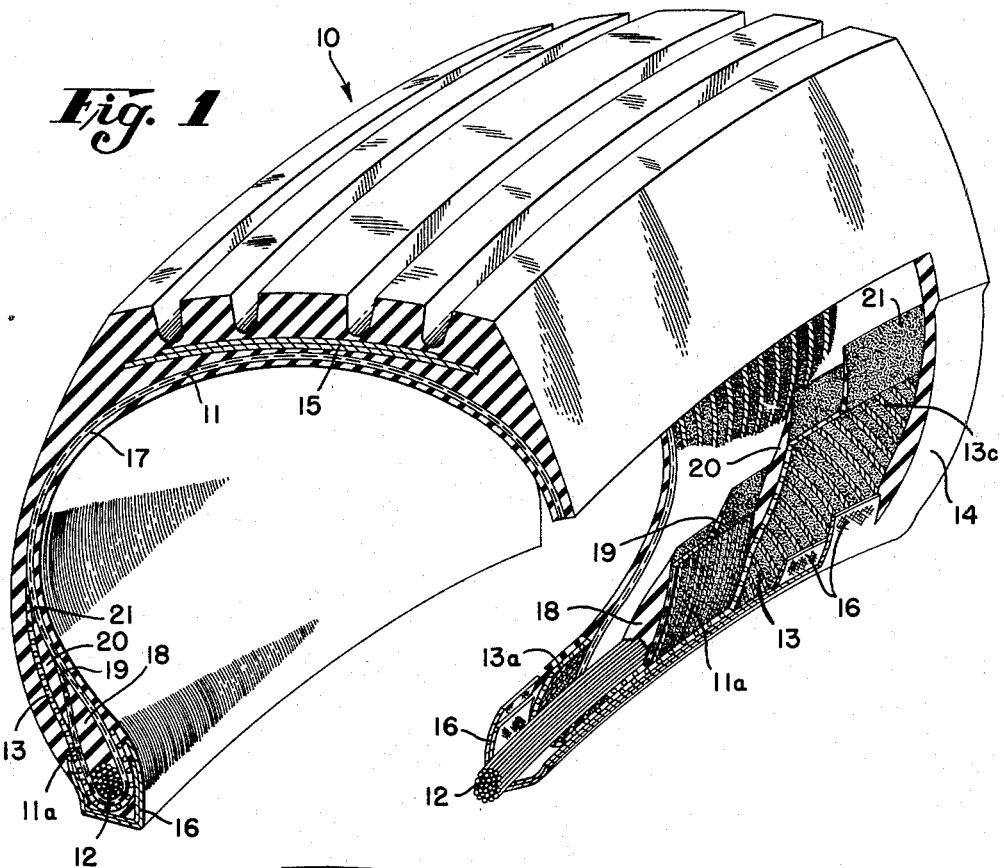

Nov. 1, 1960    W. C. MACKLEM ET AL    2,958,360
PNEUMATIC TIRES AND BEAD CONSTRUCTION THEREFOR
Filed June 26, 1959

INVENTOR.
WALTER C. MACKLEM
BY LEONARD S. STOKES

Robert J. Patterson
ATTORNEY.

United States Patent Office 2,958,360
Patented Nov. 1, 1960

2,958,360

PNEUMATIC TIRES AND BEAD CONSTRUCTION THEREFOR

Walter C. Macklem, Warren, and Leonard S. Stokes, St. Clair Shores, Mich., assignors to United States Rubber Company, New York, N.Y., a corporation of New Jersey Filed June 26, 1959, Ser. No. 823,190

10 Claims. (Cl. 152—354)

This invention relates to pneumatic tires, and in particular to bead constructions for monoply tires.

Monoply tires generally comprise a carcass constituted essentially by a single ply of wire tire fabric covered by the usual sidewall and tread stock of any suitable composition. The wire fabric is not woven, but consists of a plurality of substantially parallel wire elements arranged in the form of a single layer skim-coated on both sides with rubber. As in multiply tires, the lateral edges of the single carcass ply of a monoply tire are folded about or turned up over a pair of bead wire bundles located at the wheel rim engaging portions of the tire. Inasmuch as this bead arrangement, i.e., a single fabric ply wrapped around a bead wire bundle, is not inherently strong enough to withstand the vehicle torque to which the bead region of a tire is subjected, it is the usual practice in the manufacture of monoply tires to provide an auxiliary wire or cord fabric layer at each bead, this auxiliary layer, generally termed a "flipper," being folded over the carcass ply turnup which is wrapped around the bead wire bundle. In this manner, a stronger joint is formed between the beads and the carcass ply.

One of the problems which has beset the tire industry for many years in the manufacturing of monoply tires is that of separation of the flippers from the carcass ply turnups at the bead regions due to repeated flexing of the beads during use of the tires. Attempts have been made in the past to overcome this problem in a number of ways, for example by the provision of separate filler or "apex" strips of rubber at three different locations adjacent each bead wire bundle, one between the carcass ply and the ply turnup, one between the ply turnup and the flipper, and one at the outside edge of the flipper, with the object of "burying" the free edges of the turnup and the flipper. Another attempt made was to vary the "flipper angle," i.e., the angle between the flipper cords and the crown center line of the tire. Nevertheless, tests showed that the flipper separation continued to occur after very short periods of use of the tires so modified.

It is, therefore, an important object of the present invention to provide a bead construction for monoply tires which is highly efficacious and resistant to flipper separation during use of the tire.

Another object of the present invention is the provision of a bead construction for monoply tires which reduces the amount of stress, i.e., the flexure-produced compression and tension forces, exerted on the tires in the bead regions thereof.

A related object of the present invention, thus, is the provision of such a bead construction in which the use of an optimum number of apex strips in conjunction with specially placed auxiliary filler strips and with a proper location of the carcass ply turnup and the flipper substantially eliminates tire failure due to flipper separation and enables monoply tires to last for the entire intended useful life thereof.

To this end, it is contemplated in accordance with the present invention to position the uppermost edge of the ply turnup away from the flipper and in such a location that a quantity of rubber is disposed between the turnup and the flipper and another quantity of rubber between the turnup and the carcass ply proper. This location is subjected to minimal compression and tension forces during normal flexing of the bead region of the tire. Specifically, it is contemplated to position the carcass ply turnup edge precisely on the "neutral axis of bending" of the tire while leaving the flipper at its conventional location adjacent the outer surface of the sidewall.

As is well known, the neutral axis of bending in any object, such as a beam, is a plane or line along which the degree of tension and compression during flexure is a minimum (ideally zero). With respect to any given object, the location of the neutral axis of bending is determined by the geometrical shape of the object. In applying this principle to a pneumatic monoply tire, and in particular to the bead region of such a tire, it can be shown that the neutral axis extends along a line passing through the center of the bead wire bundle and approximately through the center of the wire fabric carcass ply at substantially the point of maximum cross-section of the tire.

It will be understood, of course, that the location of the neutral axis in any given tire is, therefore, determined by the carcass construction, the type of material employed and the amount of rubber which is to be disposed between the flipper and the carcass ply so as to bring about a predetermined shape of the bead region.

Figure 2:
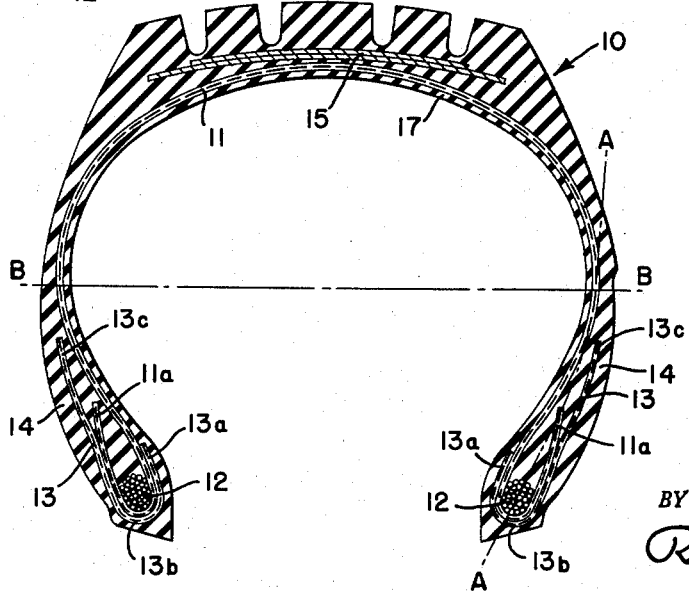

The foregoing and other objects, characteristics and advantages of the present invention will be more fully appreciated from the following detailed description of the invention when read in conjunction with the accompanying drawing, in which:

Fig. 1 is a partly sectional and broken away isometric view of a monoply tire constructed in accordance with the principles of the present invention; and Fig. 2 is a radial sectional view of such a monoply tire.

As clearly shown in Figs. 1 and 2, the tire 10 according to the present invention comprises a carcass 11 consisting of a single ply of a wire fabric constructed essentially of a plurality of parallel wires arranged in the form of a layer skim-coated on both sides with rubber. The wires are arranged substantially at right angles to the crown center line of the tire 10. The tire further comprises a pair of bead wire bundles 12 about which the opposite side regions 11a of the carcass ply 11 are folded or wrapped, a pair of reinforcing wire or cord fabric flippers 13 extending about the bead wire bundles 12 and along the surface of the carcass ply 11 remote from that surface of the latter which is contacted by the bead wires, and an outer covering 14 of rubber (sidewall and tread stock of any suitable composition). If desired, one or more breaker plies 15, preferably made of wire fabric, may be interposed between the crown portion of the carcass ply 11 and the tread of the tire. The tire illustrated is of the tubeless type and thus is also equipped with square woven chafers 16.

The tire 10 is so constructed that its neutral axis of bending at one side, designated (for the right-hand side only) by the line A—A shown in Fig. 2, passes through the center of the associated bead wire bundle 12 and through the center (the middle plane) of the carcass ply 11 at that side substantially at the region of largest cross-section of the tire, designated by the line B—B. A similar neutral axis of bending exists for the other side of the tire. The carcass ply 11 and the flippers 13 are so arranged that the free edge of each turnup 11a of the carcass ply is located precisely on the associated neutral axis A—A, while the corresponding flipper 13 has a portion 13a in surface engagement with the carcass ply at the inside of the tire, a portion 13b in contact with the ply in the immediate vicinity of and around the bead wire bundle 12, and a turnip portion 13c spaced from the ply turnup 11a and located to the outside of the said associated neutral axis A—A.

The dimensions and thus the locations of the flippers 13 are of considerable importance. Primarily, it is to be noted that each flipper must terminate well above the free edge of the respective ply turnup 11a, inasmuch as the flippers serve as reinforcement means for the beads and thus must effectively constitute extensions of the ply. Care must be taken, however, that the upper most flipper edges do not extend into the zone of maximum flexing (above the line B—B), since this would in effect turn the upper sidewall into a two-ply construction. The upper flipper edges, it must be noted, are never located and can never be located on the sides of the respective neutral axes opposite to those indicated in Fig. 2 (at the inside of the tire), since the position of each neutral axis as well as the direction thereof changes with a change in the location of the associated flipper. Stated in other words, if the flipper edges were to be brought in contact with the carcass ply 11, the neutral axis A—A at each side of the tire would pass through the line of contact. It will be understood, of course, that if the upper flipper edges were to be so displaced, the positions of the ply turnup edges 11a would necessarily have to be changed accordingly in order to maintain these edges on the neutral axes of bending.

In the manufacture of a tire according to the present invention, the chafers 16, the calendered liner stock 17, the flippers 13 and the carcass ply 11 are assembled on a suitable tire building device, for example a conventional building drum, with the wire elements extending from one end of the drum to the other, i.e., substantially at an angle of 90° to the circumferential direction of the drum and parallel to the axis thereof. The cord angles of the flippers relative to the circumferential direction of the building drum is preferably between 25° and 60°, but may be anywhere between about 15° and about 90° wtihout being unduly detrimental to the ultimate performance characteristics of the finished tire. The bead wires 12 are then placed in their proper positions at the opposite ends of the building device.

An apex strip 18 (Fig. 1) extruded to the desired shape and provided with a thin edge at one side is now positioned adjacent each bead wire bundle 12 with the wider side edge of each strip 18 contacting the associated bead wire bundle, whereupon the respective side regions of the carcass ply 11 are folded over the bead wire bundles so as to lie against the apex strips 18, thus forming the turnups 11a. The apex strips 18 thus fill the voids above the bead wires and provide the necessary contact surfaces for the ply turnups 11a, these strips being shaped as accurately as possible to dispose the upper edges of the turnups on the respective neutral axes of bending A—A.

In order to ensure that the void above the free edge of each ply turnup 11a is filled, there are provided two filler strips 19 the wider edges of which contact the ply turnup edges as shown in Fig. 1. The flippers 13 are then folded about the ply turnups, and the proper positioning of the ply turnups 11a, as well as of the flippers relative to the ply turnups, is further ensured by the provision of a second pair of apex strips 20. In a manner similar to that described with respect to the ply turnups, a pair of filler strips 21 are positioned above and in edge to edge contact with the free edges of the flippers 13 to fill the voids at these edges. The outer tire covering 14 is then applied to the carcass on the building device in the usual manner. If the presence of the breakers 15 (the incorporation of which in the tire consttiutes no part of the present invention) is desired, the same must, of course, be first properly positioned about the carcass before the outer covering is applied. Another important characteristic of the present invention will now be apparent, to wit that each of the upper edges of the ply turnups is completely covered by or embedded in rubber due to the two-piece apex construction employed, being confined between the respective apex strips 18 and 19 and the filler strips 20.

The so built up structure is then removed from the building drum and ultimately transferred to a mold in the conventional manner where it is cured. Upon completion of the curing operation, the finished tire will have a bead construction which will flex normally under use but with a minimum amount of movement of the ply turnup edges. In this manner, the heretofore inevitably encountered flipper-ply turnup separation failures of monoply wire tires is effectively eliminated. Tires so constructed have been tested both in the laboratory and the field and have successfully resisted such failure even after continuous operation under conditions much more rigorous than those likely to be encountered in actual use. Moreover, the novel tire construction according to the present invention is as applicable to tube-type tires as to tubeless tires. With respect to the latter, also, the problem of chafing is substantially overcome, in particular by the use of lower flipper cord angles, say from 15° to 40°.

It will be understood that a number of variations may be made in the present invention wtihout any departure from the spirit thereof and from the scope of the appended claims.

Having thus described our invention, what we claim and desire to secure by Letters Patent is:

1. A pneumatic tire, comprising a carcass composed of rubber-coated fabric, a pair of bead wire bundles, the opposite side regions of said carcass fabric being folded one about each of said bead wire bundles to form a pair of turnups directed toward the crown of the tire and having respective radially outermost edges located on the respective neutral axes of bending of the bead regions of the tire, and a pair of flippers folded about said side regions of said carcass fabric, respectively, and having at each bead of the tire a short portion located at the inside of the tire and a relatively longer portion located at the outside of the tire, said longer flipper portions extending a greater distance toward the crown of the tire than the associated turnups of said carcass fabric and having respective radially outermost edges terminating short of the region of maximum cross-section of the tire.

2. A pneumatic tire, comprising a carcass composed of rubber-coated fabric, a pair of bead wire bundles, the opposite side regions of said carcass fabric being folded one about each of said bead wire bundles to form a pair of turnups directed toward the crown of the tire and having respective radially outermost edges located on the respective neutral axes of bending of the bead regions of the tire, and a pair of flippers folded about said side regions of said carcass fabric, respectively, and having at each bead of the tire a short portion located at the inside of the tire and a relatively longer portion located at the outside of the tire, said longer flipper portions extending a greater distance toward the crown of the tire than the associated turnups of said carcass fabric and having respective radially outermost edges terminating short of the region of maximum cross-section of the tire, the radially outermost region of each of said flippers being spaced from the radially outermost region of the corresponding carcass fabric turnup.

3. A pneumatic tire, comprising a carcass composed of rubber-coated fabric, a pair of bead wire bundles, the opposite side regions of said carcass fabric being folded one about each of said bead wire bundles to form a pair of turnups directed toward the crown of the tire and having respective radially outermost edges located on the respective neutral axes of bending of the bead regions of the tire, and a pair of flippers folded about said side regions of said carcass fabric, respectively, and having at each bead of the tire a short portion located at the inside of the tire and a relatively longer portion located at the outside of the tire, said longer flipper portions extending a greater distance toward the crown of the tire than the associated turn-ups of said carcass fabric and having respective radially outermost edges terminating short of the region of maximum cross-section of the tire, the radially outermost region of each of said flippers being spaced from the radially outermost region of the corresponding carcass fabric turnup, and said radially outermost regions of said carcass fabric turnups being completely embedded between bodies of rubber located, respectively, between each turnup and the body of said carcass fabric, between each turnup and the associated flipper, and at the radially outermost edge of each turnup.

4. A pneumatic monoply tire, comprising a carcass composed of a single ply of rubber-coated wire fabric, a pair of bead wire bundles, the opposite side regions of said wire fabric ply being folded one about each of said bead wire bundles to form a pair of ply turnups directed toward the crown of the tire and having respective radially outermost edges located on the respective neutral axes of bending of the bead regions of the tire, and a pair of flippers of rubber-coated cord fabric folded about said side regions of said wire fabric ply, respectively, and having at each bead of the tire a short portion located at the inside of the tire and a relatively longer portion located at the outside of the tire, said longer flipper portions extending a greater distance toward the crown of the tire than said ply turnups and having respective radially outermost edges terminating below the region of maximum cross-section of the tire.

5. A pneumatic monoply tire, comprising a carcass composed of a single ply of rubber-coated wire fabric, a pair of bead wire bundles, the opposite side regions of said wire fabric ply being folded one about each of said bead wire bundles to form a pair of ply turnups directed toward the crown of the tire and having respective radially outermost edges located on the respective neutral axes of bending of the bead regions of the tire, and a pair of flippers of rubber-coated cord fabric folded about said side regions of said wire fabric ply, respectively, and having at each bead of the tire a short portion located at the inside of the tire and a relatively longer portion located at the outside of the tire, said longer flipper portions extending a greater distance toward the crown of the tire than said ply turnups and having respective radially outermost edges terminating below the region of maximum cross-section of the tire, the radially outermost region of each of said flippers being spaced from the radially outermost region of the corresponding ply turnup.

6. A pneumatic monoply tire, comprising a carcass composed of a single ply of rubber-coated wire fabric, a pair of bead wire bundles, the opposite side regions of said wire fabric ply being folded one about each of said bead wire bundles to form a pair of ply turnups directed toward the crown of the tire and having respective radially outermost edges located on the respective neutral axes of bending of the bead regions of the tire, and a pair of flippers of rubber-coated cord fabric folded about said side regions of said wire fabric ply, respectively, and having at each bead of the tire a short portion located at the inside of the tire and a relatively longer portion located at the outside of the tire, said longer flipper portions extending a greater distance toward the crown of the tire than said ply turnups and having respective radially outermost edges terminating below the region of maximum cross-section of the tire, the radially outermost region of each of said flippers being spaced from the radially outermost region of the corresponding ply turnup, and said radially outermost regions of said ply turnups being completely embedded between bodies of rubber located, respectively, between each turnup and the body of said wire fabric ply, between each turnup and the associated flipper, and at the radially outermost edge of each turnup.

7. A pneumatic tire according to claim 6, said wire fabric comprising a plurality of substantially parallel wire elements arranged in the form of a layer skim-coated with rubber on both sides, said wire elements being disposed at substantially a 90° angle relative to the crown center line of the tire.

8. A pneumatic tire according to claim 7, the cord angle of each of said flippers relative to said crown center line of said tire ranging from about 15° to about 90°.

9. A pneumatic tire according to claim 7, the cord angle of each of said flippers relative to said crown center line of the tire being 25°.

10. A bead construction for a pneumatic monoply tire in which the carcass is composed of a single ply of rubber-coated wire fabric, comprising a bundle of bead wires, said wire fabric ply having its end region folded about said bead wire bundle to form a ply turnup directed toward the crown of the tire and having a radially outermost edge located on the neutral axis of bending of the bead region of the tire, whereby a first space is defined between said ply turnup and the body of said wire fabric ply above said bead wire bundle, a flipper of rubber-coated cord fabric folded about said side region of said wire fabric ply and having a short portion located at the inside of the tire and a relatively longer portion located at the outside of the tire, said longer flipper portion extending a greater distance toward the crown of the tire than said ply turnup and having a radially outermost edge terminating below the region of maximum cross-section of the tire, the radially outermost region of said longer flipper portion being separated from the radially outermost region of said ply turnup to define therebetween a second space, a first rubber apex strip positioned in and filling said first space, a second rubber apex strip positioned in and filling said second space, whereby the location of said radially outermost edge of said ply turnup is accurately predetermined, a first rubber filler strip positioned above and in contact with said radially outermost edge of said ply turnup to fill the void thereabove, and a second rubber filler strip positioned above and in contact with said radially outermost edge of said flipper to fill the void thereabove.

References Cited in the file of this patent

UNITED STATES PATENTS 2,501,372   Benson ---------------- Mar. 21, 1950